United States Patent
Deknecht et al.

(10) Patent No.: US 12,289,289 B1
(45) Date of Patent: Apr. 29, 2025

(54) AUTOMATED DELEGATION OF DOMAIN NAME SYSTEM (DNS) CONFIGURATION OPERATIONS BY HOSTED ZONES

(71) Applicant: State Farm Mutual Automobile Insurance Company, Bloomington, IL (US)

(72) Inventors: Tyler Deknecht, Bloomington, IL (US); Todd D. Wigginton, Congerville, IL (US); Matthew Cole, Gilbert, AZ (US); Connor Schwirian, Tempe, AZ (US); Luke Cernetic, Colorado Springs, CO (US); Kesav Kadalazhi, Chandler, AZ (US); Krishna Nagarajan, Phoenix, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/476,143

(22) Filed: Sep. 27, 2023

(51) Int. Cl.
*H04L 61/4511* (2022.01)
*H04L 61/3015* (2022.01)

(52) U.S. Cl.
CPC ...... *H04L 61/4511* (2022.05); *H04L 61/3025* (2013.01)

(58) Field of Classification Search
None
See application file for complete search history.

(56) References Cited

U.S. PATENT DOCUMENTS

| 11,489,814 | B1 | 11/2022 | Engskow et al. |
| 2008/0235383 | A1* | 9/2008 | Schneider ............... H04L 61/30 709/229 |
| 2017/0339096 | A1* | 11/2017 | Krzywonos ........... H04L 61/301 |
| 2021/0105248 | A1* | 4/2021 | Brown ................ H04L 61/4511 |

OTHER PUBLICATIONS

AWS, "Automating DNS infrastructure using Route 53 Resolver endpoints," downloaded from https://aws.amazon.com/blogs/networking-and-content-delivery/automating-dns-infrastructure-using-route-53-resolver-endpoints/ on Sep. 27, 2023, 39 pages.
AWS, "Automating Domain Delegation for Public Applications in AWS," downloaded from https://aws.amazon.com/blogs/networking-and-content-delivery/automating-domain-delegation-for-public-applications-in-aws/ on Sep. 27, 2023, 12 pages.
(Continued)

*Primary Examiner* — June Sison
(74) *Attorney, Agent, or Firm* — Lee & Hayes, P.C.

(57) ABSTRACT

This disclosure describes example techniques for automatically configuring domain name system (DNS) servers to handle custom hostnames assigned to hosted zones. The techniques monitor DNS record sets of the hosted zones for special DNS records registering new hostnames. When such a special DNS record is detected, the central DNS server checks a database to see if that hostname is already assigned to another hosted zone. If the hostname is not assigned to another hosted zone, the central DNS server automatically updates its own DNS configuration data pair the new hostname with the Internet Protocol (IP) address of the hosted zone requesting the hostname. This allows the central DNS server to resolve future DNS queries for the new hostname by routing requests to the proper zone.

21 Claims, 6 Drawing Sheets

(56) References Cited

OTHER PUBLICATIONS

AWS, "AWS PrivateLink," downloaded from https://aws.amazon.com/privatelink/ on Sep. 27, 2023, 6 pages.
AWS, "Powering Secondary DNS in a VPC using AWS Lambda and Amazon Route 53 Private Hosted Zones," downloaded from https://aws.amazon.com/blogs/compute/powering-secondary-dns-in-a-vpc-using-aws-lambda-and-amazon-route-53-private-hosted-zones/ on Sep. 27, 2023, 17 pages.

* cited by examiner

400 →

```
"requestID": "t2ayos75kqsh24ug9zys-hmk70tu92aazn8gu2h6t"
        "requestParameters": {
                "ChangeBatch": {
                        "Changes" : [
                                {
                                        "action": "CREATE",
                                        "resourceRecordSet": {          404 →
                                                "name": "_share.myzone.mydomain"
                                                "resourceRecords": [
                                                        {
                                                                "value": "\"infra\""
                                                        }
                                                "tTL": 300,
                                                "type": TXT
                                        }
                                }
                        ]              402 →
                },
                "hostedZoneId" : F8D8FJU2ZHMAMA12D4VW
```

FIG. 4

AUTOMATED DELEGATION OF DOMAIN NAME SYSTEM (DNS) CONFIGURATION OPERATIONS BY HOSTED ZONES

TECHNICAL FIELD

The present disclosure relates to domain name system (DNS) configuration, and more particularly to techniques for automated delegation of DNS configuration operations by a hosted zone to a central DNS component.

BACKGROUND

The DNS protocol enables the translation of human-readable domain names into machine-readable IP addresses. This allows users to access websites and other Internet resources using easy-to-remember domain names rather than hard-to-memorize Internet Protocol (IP) address numbers. Typically, when a user tries to access a domain name, the corresponding computer system queries a domain name system (DNS) resolver to find the IP address for that domain. The DNS resolver then queries multiple DNS servers around the Internet to determine which server is authoritative for that domain and can provide the correct IP. This global hierarchy of DNS servers is updated as new domains are configured and assigned to nameservers.

In the cloud computing era, it is common for companies to utilize hosted zones, which are segregated DNS namespaces offered by cloud computing platforms. Companies can configure DNS records within hosted zones tailored to their application domains and hostnames. However, managing DNS configurations across many hosted zones can become complex.

Currently, developers maintain application-specific DNS servers in the cloud computing platform and manually update such application-specific DNS servers every time they allocate a new hostname to a hosted zone. This is cumbersome and complicates DNS management as the number of hosted zones grows. Therefore, there is a need for improved systems to automate DNS configuration across hosted zones in a cloud environment.

Examples of the techniques described in the present disclosure are directed to overcoming the deficiencies noted above.

SUMMARY

In some examples, the techniques described herein relate to a computer-implemented method, including receiving, by a processor and at a first time, a first request for updating a first data field asynchronously. The techniques further include detecting, by a processor of a domain name system (DNS) server, a first text record in a first DNS record set, wherein the first DNS record set is stored in a first hosted zone accessible by the DNS server, wherein the first text record requests assignment of a first hostname to the first hosted zone. The techniques further include retrieving, by the processor and based on detecting the first text record, a hostname database comprising a second hostname assigned to a second hosted zone managed by the DNS server. The techniques further include determining, by the processor and by querying the hostname database, that the first hostname is available for use by the first hosted zone. The techniques further include generating, by the processor and based on determining that the first hostname is available for use by the first hosted zone, first DNS configuration data that assigns the first hostname to the first hosted zone.

In additional examples, the techniques described herein relate to a computing system, including: a processor; and memory storing computer-executable instructions that, when executed by the processor, cause the computing system to perform operations including detecting a first text record in a first DNS record set, wherein the first DNS record set is stored in a first hosted zone accessible by the DNS server. The techniques further include retrieving, based on detecting the first text record, a hostname database comprising a second hostname assigned to a second hosted zone managed by the DNS server. The techniques further include determining, by querying the hostname database, that the first hostname is available for use by the first hosted zone. The techniques further include generating, based on determining that the first hostname is available for use by the first hosted zone, first DNS configuration data that assigns the first hostname to the first hosted zone.

In further examples, the techniques described herein relate to one or more non-transitory computer-readable media storing computer-executable instructions that, when executed by the processor, cause the one or more processors to perform operations, including detecting a first text record in a first DNS record set, wherein the first DNS record set is stored in a first hosted zone accessible by the DNS server. The techniques further include retrieving, based on detecting the first text record, a hostname database comprising a second hostname assigned to a second hosted zone managed by the DNS server. The techniques further include determining, by querying the hostname database, that the first hostname is available for use by the first hosted zone. The techniques further include generating, based on determining that the first hostname is available for use by the first hosted zone, first DNS configuration data that assigns the first hostname to the first hosted zone.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 provides an operational example of an entry in the hostname database that maps a hosted zone identifier to a hostname.

DETAILED DESCRIPTION

This disclosure describes example techniques for automatically configuring DNS servers to handle custom hostnames assigned to hosted zones. The techniques monitor DNS record sets of the hosted zones for special DNS records registering new hostnames. When such a special DNS record is detected, the central DNS server checks a database to see if that hostname is already assigned to another hosted zone. If the hostname is not assigned to another hosted zone, the central DNS server automatically updates its own DNS configuration data pair the new hostname with the Internet Protocol (IP) address of the hosted zone requesting the hostname. This allows the central DNS server to resolve future DNS queries for the new hostname by routing requests to the proper zone.

Figure 1:
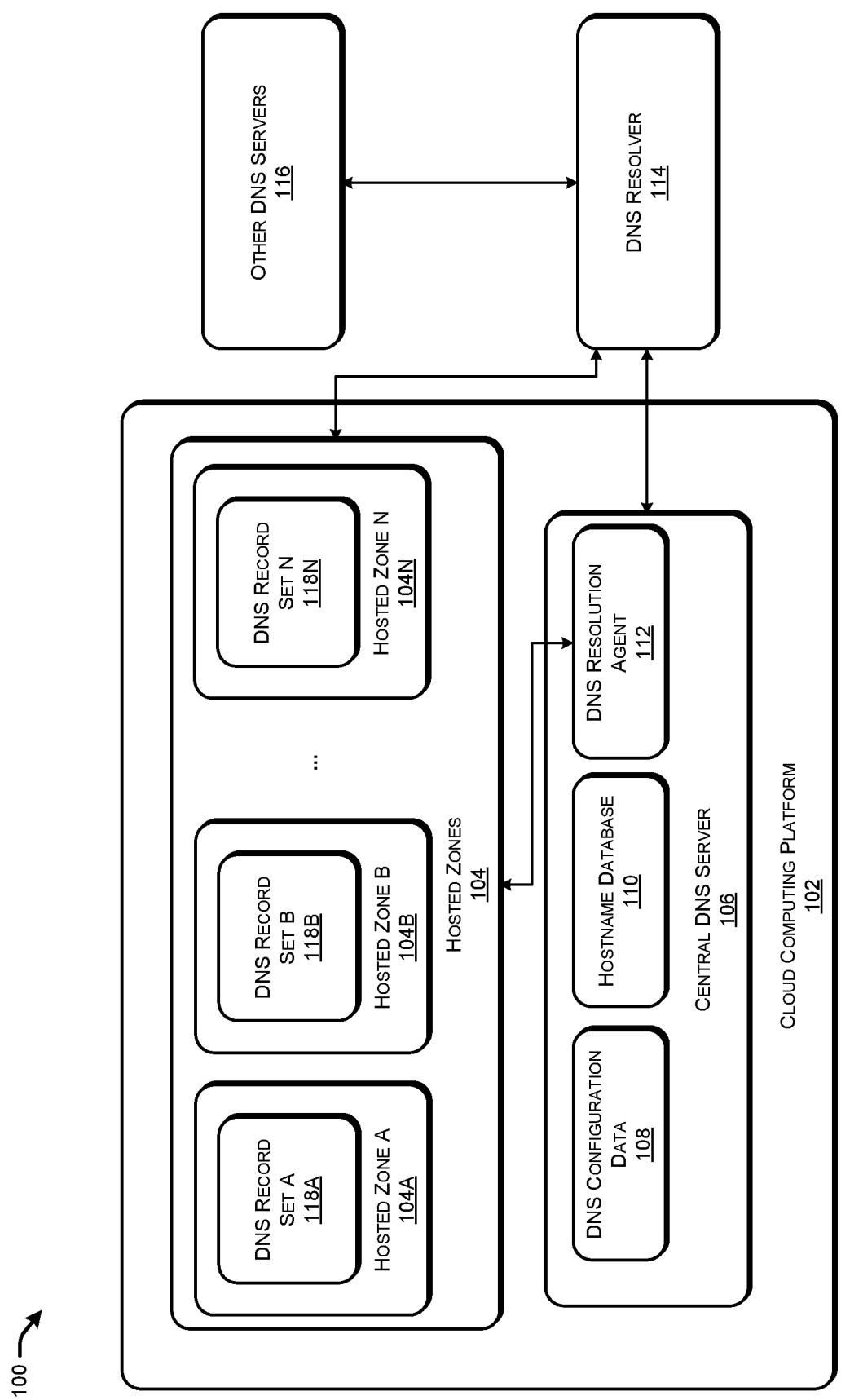
FIG. 1 depicts an environment that enables automated delegation of DNS configuration by a hosted zone to a central DNS component.

FIG. 1 depicts an environment 100 that enables automated delegation of DNS configuration by a hosted zone to a central DNS component. The environment 100 includes a cloud computing platform 102, a DNS resolver 114, and other DNS servers 116.

The cloud computing platform 102 may be a distributed computing infrastructure that utilizes clusters of computing resources to provide scalable computing capabilities and abstracted hardware infrastructure to users/customers. For example, as depicted in FIG. 1, the cloud computing platform 102 may provide infrastructure for numerous hosted zones 104 that represent segregated DNS namespaces allocated to various customers and applications. The cloud computing platform 102 may host a set of hosted zones 104.

As depicted in FIG. 1, the cloud computing platform 102 may host a set of N hosted zones 104, such as hosted zone A 104A, hosted zone B 104B, and hosted zone N. Each hosted zone may be a user-defined namespace that is maintained and managed within the cloud computing platform's 102 DNS services. Users may generate hosted zones 104 using the cloud computing platform 102 to implement customized domain names and DNS configurations tailored to their applications and services. In some cases, each hosted zone is associated with a respective software application and includes the dedicated DNS namespace for that software application.

For example, a user may generate a hosted zone 104 to define DNS records for a software application that is accessible using an internal company website. The hosted zone 104 may provide a namespace such as 'A.internal.website.com' where the user can define DNS records like 'A' records, CNAME records, and so on. These records in turn map hostnames to IP addresses, other hostnames, mail servers, etc. to implement the DNS functionality for the software application within the company's private domain.

Each hosted zone 104 contains a respective DNS record set. For example, hosted zone A 104A contains the DNS record set A 118A, hosted zone B 104B contains the DNS record set B 118B, and hosted zone N 104N contains the DNS record set N 118N. The DNS record sets may hold the DNS records such as A, AAAA, CNAME, MX, NS, PTR, SOA, SPF, SRV, and/or TXT records for their respective hosted zones 104.

The DNS records maintained by hosted zones 104 may contain the domain name system mappings between hostnames and IP addresses to facilitate translation between human-readable domain names and computer-readable IP addresses needed to locate services and devices on the Internet.

For example, DNS record set A 118A may contain 'A' records that pair hostnames for hosted zone A 104A with IP addresses of servers, virtual machines, or other computing resources allocated to hosted zone A's 104A respective software application. An example of a DNS record that may be in the DNS record set A 118A may be an 'A' record that maps the domain name 'A.internal.website.com/faq' to a respective IP address.

As further depicted in FIG. 1, cloud computing platform 102 contains a central DNS server 106 that includes DNS configuration data 108, a hostname database 110, and a DNS resolution agent 112. In some cases, the central DNS server 106 facilitates DNS resolution for uniform resource locators (URLs) associated with the hosted zones 104. In some cases, the central DNS server 106 enables the hosted zones 104 to delegate DNS configuration to a central component.

DNS configuration data 108 may contain DNS records (e.g., name server (NS) records) that associate hostnames with the IP addresses of their corresponding hosted zones 104. For example, the DNS configuration data 108 may contain NS records that pair the hostname 'A.internal.website.com' with the IP address of hosted zone A 104A, the hostname 'B.internal.website.com' with the IP address of hosted zone B 104B, and so on.

The NS records in DNS configuration data 108 may enable the central DNS server 106 to refer DNS resolution requests for a particular hostname to the proper hosted zone 104 that 'owns' that hostname. For example, by using the NS record that maps the hostname 'A.internal.website.com' to the IP address of the hosted zone A 104A, the central DNS server 106 may be able to respond to a DNS resolution request for the URL 'A.internal.website.com/faq' with the IP address of the hosted zone A 104a. The DNS configuration data 108 may thus provide a high-level mapping of hostnames to their respective hosted zone namespaces.

In some cases, the DNS configuration data 108 include configuration data associated with a cloud computing platform, such as configuration data for associating a virtual private cloud (VPC) with a hosted zone. For example, to associate a VPC that was created with one account with a private hosted zone that was created with a different account, a user may perform the following steps: (i) using the account that created the hosted zone, authorizing the association of the VPC with the private hosted zone, (ii) using the account that created the VPC, associating the VPC with the hosted zone, and/or (iii) removing the authorization to associate the VPC with the hosted zone after completing the association (e.g., to prevent reassociating the VPC with the hosted zone in the future without reauthorizing).

As another example, to associate a VPC created in one account with a private DNS zone created in a different account, a user may first create the private hosted zone and then link the zone with the VPC. This allows virtual machines (VMs) in that VPC to access the zone. Linking the zone to the VPC can be done with or without auto-registration. Auto-registration makes the VPC a registration VPC, automatically creating DNS records for VMs deployed there. The zone becomes the registration zone for that VPC. Without auto-registration, the VPC becomes a resolution VPC, such that records will not be automatically created for VMs, but they can query existing records in the zone.

The hostname database 110 may contain records that identify which specific hostnames are allocated to each of the individual hosted zones 104. For example, the hostname database 110 may associate the hostname ' A.internal.website.com/faq' with a unique ID for hosted zone A 104A, the hostname 'B.internal.website.com/search' with a unique ID for hosted zone B 104B, and so forth. In some cases, the hostname database 110 tracks ownership and allocation of hostnames across the various hosted zones 104 to prevent namespace collisions.

The hostname database 110 may be implemented as a ledger. In a ledger-style implementation, each entry in the database may represent a hostname allocation transaction, such as an event in which a hostname is allocated to a hosted zone, an event in which the allocation of a hostname to a hosted zone is removed, or an event in which one or more parameters associated with the allocated of a hostname to a hosted zone are modified. Each ledger entry may include details such as the specific hostname, the unique identifier of the hosted zone to which it is assigned, and the timestamp of the transaction, and/or the like.

In some cases, implementing the hostname database 110 as a ledger enables easy tracking of the chronological allocation of hostnames to hosted zones and provides a clear history of hostname assignments. In this way, the hostname database 110 operates as a detailed transactional log to maintain a historical record of all hostname allocation operations. One advantage of implementing the hostname database 110 as a ledger is that it facilitates better visibility into the sequence and context of hostname assignments. This can be particularly useful in cases of troubleshooting or auditing, where an understanding of the allocation history of a specific hostname can be beneficial. For example, if there's a dispute about the current ownership of a particular hostname, the system could refer to this ledger for a reliable and accurate record.

The DNS resolution agent 112 may be configured to perform at least one of two tasks: (i) updating the DNS configuration data 108 based on requests by hosted zones to delegate DNS configuration tasks to the central DNS server 106, or (ii) receiving DNS resolution requests from DNS resolver 114 and return IP addresses of corresponding hosted zones in response.

In some cases, the DNS resolution agent 112 is configured to update the DNS configuration data 108 based on requests from the individual hosted zones 104. For example, in some cases, when a hosted zone 104 wants to delegate a new hostname to the central DNS server 106, the hosted zone 104 generates a special DNS record (e.g., a text (TXT) record) in its DNS record set. This special record DNS record may include the unique ID of the hosted zone 104 and the hostname it wants to use. After detecting a special DNS record, the DNS resolution agent 112 may determine whether the hostname is allocated to another hosted zone using the hostname database 110. If the hostname is not allocated to another hosted zone, the DNS resolution agent 112 may modify the DNS configuration data 108 and/or the hostname database 110 accordingly.

In examples, to update DNS configuration data 108, the DNS resolution agent 112 may detect that a particular hosted zone has placed a special record (e.g., a TXT record) in its respective DNS record set. The special record may include the unique zone identifier of the hosted zone and a requested hostname. The DNS resolution agent 112 may then use the hostname database 110 to determine whether the requested hostname is available for use by the requesting host name (e.g., whether the requested hostname is allocated to another hosted zone).

If the DNS resolution agent 112 determines that the requested hostname represented by the special record is available for use by the requesting hosted zone, the DNS resolution agent 112 may modify the DNS configuration data 108 to allocate the requested hostname to the requesting hosted zone. For example, the DNS resolution agent 112 may modify the DNS configuration data to add an NS record that associates the requested hostname with an IP address of the requesting hosted zone. If the DNS resolution agent 112 determines that the requested hostname represented by the special record is available for use by the requesting hosted zone, the DNS resolution agent 112 may also modify the hostname database 110 to allocate the requested hostname to a unique zone identifier of the requesting hosted zone.

The DNS resolution agent 112 may be configured to resolve DNS queries from external DNS resolvers 114. When the central DNS server 106 receives a query for a hostname under its management, the DNS resolution agent 112 refers to the DNS configuration data 108 to determine which hosted zone 104 'owns' that hostname. The DNS resolution agent 112 then responds to the query with the IP address of that hosted zone 104. For example, when the DNS resolution agent 112 receives a query for 'A.internal.website.com/faq', the DNS resolution agent 112 looks up this hostname in the DNS configuration data 108 and sees it is assigned to hosted zone A 104A. The DNS resolution agent 112 then returns the IP address of hosted zone A 104A back to the DNS resolver 114 that originated the query. This resolution process allows the central DNS server 106 to field queries for any hostnames assigned to a hosted zone 104 and route the queries to the proper hosted zone 104 for further resolution. In this manner, the central DNS server 106 operates as an intermediary redirection point for DNS queries involving hosted zones 104 and their allocated hostnames.

In examples, the DNS resolution agent 112 operates as a serverless application that can be activated when a special record is detected in the DNS record set of a hosted zone. The special record, for example, may be a TXT record that indicates the need to add association of a hostname to a hosted zone, remove such an association, or modify the IP address of a hosted zone that is currently assigned a particular domain name. Once a special DNS record is detected, the serverless function is triggered to update the DNS configuration data 108. This function, upon activation, may validate the special record using the hostname database 110, and, if validated, proceed to modify the DNS configuration data 108 accordingly. The update could include changes in hostname to IP address mappings, adjustments in TTL values, or any other DNS related configurations that are essential for proper routing of network requests.

In some cases, the process performed by the DNS resolution agent 112 to validate a special DNS record, validate the record, and update DNS configuration data 108, by virtue of being serverless, remains idle and does not consume resources when there are no changes in the DNS record sets.

Moreover, the serverless nature of the process performed by DNS resolution agent 112 after detecting a special DNS record allows for high scalability. As the number of hosted zones and the frequency of changes increase, the function can scale to meet the growing demand to ensure efficient management of DNS records. The ability of the DNS resolution agent 112 to execute a serverless function to update DNS configuration data 108 enhances system responsiveness, optimizes resource usage, and maintains accuracy of DNS records.

In addition to the central DNS server 106, environment 100 also contains standard DNS resolvers 114. DNS resolvers 114 may be client-side processes, typically running on end-user computers, that generate recursive DNS queries to resolve hostnames into IP addresses. When an end-user tries to access a hostname such as 'A.internal.website.com/support', the end user's computer generates a DNS query that is handled by the DNS resolver 114 on that device. The DNS resolver 114 may then recursively determine the IP address for the given hostname through a series of queries to DNS servers 116, the central DNS server 106, and the DNS record sets of the hosted zones. In some cases, to access the DNS record sets of hosted zones as part of this recursive query pattern, the DNS resolver 114 first queries the central DNS server 106, which returns the IP address of the hosted zone 104 that is assigned the given hostname. The DNS resolver 114 would then query the specific hosted zone 104 to retrieve the IP address of the actual resource specified by the hostname, such as a web server for that zone.

In some cases, after the DNS resolution agent 112 updates the DNS configuration data 108 to reflect that a hostname is allocated to a hosted zone, the DNS resolution agent 112 may resolve DNS resolution requests from a DNS resolver 114 by returning the IP address of the hosted zone. For example, the DNS resolver may request DNS resolution for the URL 'A.internal.website.com/faq.' In this case, the DNS resolution agent may use the DNS configuration data 108 to determine that 'A.internal.website.com' is allocated to hosted zone A 104A and thus return the IP address for the hosted zone A 104A.

A DNS resolver 114 may use other DNS servers 116 along with the central DNS server 106 to resolve a URL into an IP address. The other DNS servers 116 may be root DNS servers, top-level domain (TLD) DNS servers, domain DNS servers, subdomain DNS servers, application DNS servers, etc.

For example, if the central DNS server 106 is the subdomain DNS server for the subdomain 'internal.website.com,' the following sequence of actions may be performed to resolve a DNS request for 'A.internal.website.com/faq': first, the client device issues a request for the URL 'A.internal.website.com/faq'. This request is initially handled by the device's configured DNS resolver 114. The DNS resolver 114 converts the requested URL into an IP address. If the DNS resolver 114 has the IP address cached from a previous request, DNS resolver 114 will return it immediately. If not, DNS resolver 114 will start a recursive query, which begins with asking one of the root DNS servers where to find information about the '.com' top-level domain. The root DNS server responds to the DNS resolver 114 with a referral to the IP address of the DNS server responsible for the '.com' domain.

The DNS resolver 114 then asks the '.com' DNS server where to find information about the 'website.com' domain. The '.com' DNS server replies with a referral to the DNS server that manages the 'website.com' domain. The DNS resolver 114 sends another query, this time to the 'website.com' DNS server, asking about where to find DNS information 'internal.website.com'. The 'website.com' DNS server responds with the 'internal.website.com' information, which is the IP address of the central DNS server 106. The DNS resolver 114 sends another query to the central DNS server 106, asking about DNS information of 'A.internal.website.com.' The central DNS server 106 responds with a referral to the IP address of hosted zone A 104A. The DNS resolver 114 then retrieves the IP address of 'A.internal.website.com/faq' from the DNS record set A 118A of the hosted zone A 104A.

The DNS resolver 114 may communicate with the DNS servers over a network using the DNS protocol, a standard protocol used for translating hostnames into IP addresses. The DNS protocol operates over both UDP and TCP connections. For example, in the case of large queries or responses that exceed the typical UDP packet size, the DNS protocol can switch to TCP. To ensure reliability and consistency, the DNS resolver 114 may also use caching and time-to-live (TTL) parameters to store and control the retention of DNS information.

Accordingly, in the environment 100 of FIG. 1, the hosted zones 104 may use special records (e.g., TXT records) to delegate DNS configuration operations to the central DNS server 106. For example, when the hosted zone A 104A needs the central DNS server 106 to start handling DNS queries for a new hostname, the hosted zone 104 inserts a special TXT record into its DNS record set. This TXT record includes the unique identifier of the requesting hosted zone and the requested hostname. After the DNS resolution agent 112 detects this new TXT record in hosted zone A's DNS record set 118A, the DNS resolution agent 112 extracts the zone identifier and requested hostname from the record. The DNS resolution agent 112 then validates that hosted zone A 104A is authorized to use the requested hostname by checking the hostname database 110.

After validating that hosted zone A 104A is authorized to use the requested hostname, the DNS resolution agent 112 proceeds to update the DNS configuration data 108. For example, the DNS resolution agent 112 may add a new NS record that maps the requested hostname to the IP address of hosted zone A 104A. Using this process, hosted zones 104 can use TXT records with their zone identifiers and requested hostname to delegate DNS configurations to the central DNS server 106. The DNS resolution agent 112 then automatically validates ownership of the hostname and creates new NS records in the DNS configuration data 108 to map the hostname to the hosted zone 104. This allows the central DNS server 106 to handle DNS resolution requests for hostnames that hosted zones 104 dynamically allocate and assign.

One advantage of the automated DNS configuration process enabled by environment 100 is that this process allows developers to develop applications without having to manually configure DNS settings themselves. When developers build applications on hosted zones 104, they can focus on their application code and logic, while the central DNS server 106 handles all the background DNS operations like hostname delegation and DNS query resolution. After developers add special DNS records with their desired hostnames, the DNS resolution agent 112 will automatically handle configuring the required NS records in the DNS configuration data 108. This process abstracts away the complexities of DNS management from the developers, who can deploy applications on hosted zones 104 and rely on the central DNS server 106 to map custom hostnames and handle DNS queries on their behalf. Accordingly, the automated DNS configuration and resolution facilitates rapid development and deployment of software applications.

Another advantage of the automated DNS configuration process enabled by the environment 100 is that it enables different software applications residing on the same cloud computing platform 102 to communicate with another such software application by resolving DNS requests using the central DNS server 106. In some cases, when an application communicates with another application residing in a different hosted zone, the application can make a DNS request to the central DNS server 106. The central DNS server 106 will then use the DNS configuration data 108 to resolve the hostname of the destination application. For example, if Application A in hosted zone A 104A wants to communicate with Application B in hosted zone B 104B, Application A would send a DNS request for the hostname associated with Application B. The DNS server would consult its hostname database (which may be implemented as a ledger, as previously discussed) and return the corresponding IP address to Application A. Application A can then use the DNS record set B 118B of hosted zone B 104B to resolve the target URL associated with Application B. In this way, DNS requests associated with inter-application communications can be resolved locally, without the need to use external DNS servers.

In some cases, the cloud computing platform 102 described herein enhances interoperability across different applications using various hosted zones. This interoperability may be achieved by enabling the sharing of DNS records through a central DNS server 106, so that software applications can communicate with each other without needing to have prior knowledge of the other application's specific hosted zone details. Accordingly, the cloud computing platform 102 enables a more efficient network architecture where all applications can interact seamlessly, irrespective of their individual hosted zones.

Figure 2:
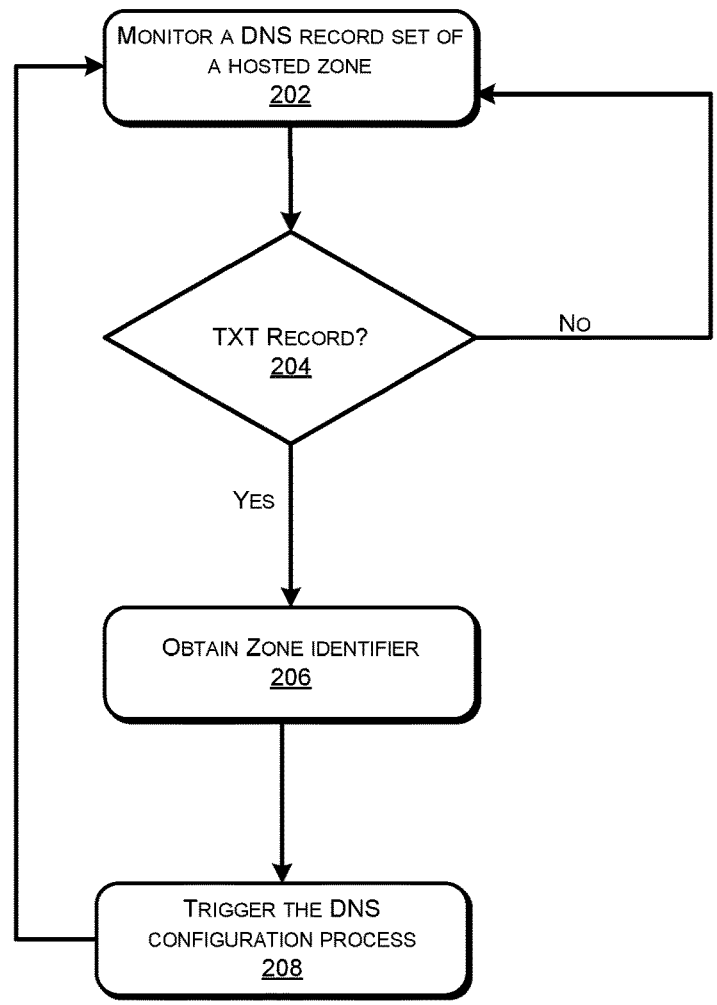
FIG. 2 is a flowchart diagram of an example process for determining whether to trigger an automated DNS configuration process.

FIG. 2 is a flowchart diagram of an example process 200 for determining whether to trigger an automated DNS configuration process. While the steps of the flowchart are described as being performed by components of the proxy server 106, it should be appreciated that the steps of the flowchart may be performed by software, by hardware or by any combination of software and hardware. Moreover, steps of the flowchart may be performed in a different order than that shown in the figure.

At operation 202, the DNS resolution agent 112 monitors the DNS record set of a hosted zone. In some cases, to monitor the DNS record set, the DNS resolution agent 112 may periodically query the central DNS server to retrieve the latest DNS records associated with the hosted zone. The frequency of these queries can be determined based on several factors, such as the rate of changes in the DNS records, the needs of the applications, or based on a predetermined schedule. In some cases, the DNS resolution agent 112 receives a notification from a service of the cloud computing platform 102 that is configured to monitor changes to the DNS record sets.

At operation 204, the DNS resolution agent 112 determines whether a special TXT record is added to the DNS record set of the hosted zone. The special TXT record may contain a key-value pair whose value is a predefined value, such as a predefined value of 'infra.' In some cases, to detect the special TXT record, the DNS resolution agent 112 compares the retrieved DNS records with the previously stored records for the hosted zone. This comparison can be performed using various algorithms that detect differences in the content, sequence, or structure of the DNS records.

If the DNS resolution agent 112 detects the presence of a special TXT record in the DNS records, as determined at operation 206, it triggers an automated DNS configuration process at operation 208. This process may involve updating the local DNS cache, notifying relevant applications of the change, or reconfiguring the system to accommodate the new DNS records. In cases where no special TXT record is detected at operation 206, the DNS resolution agent 112 continues to monitor the DNS record set as described at operation 202.

Figure 3:
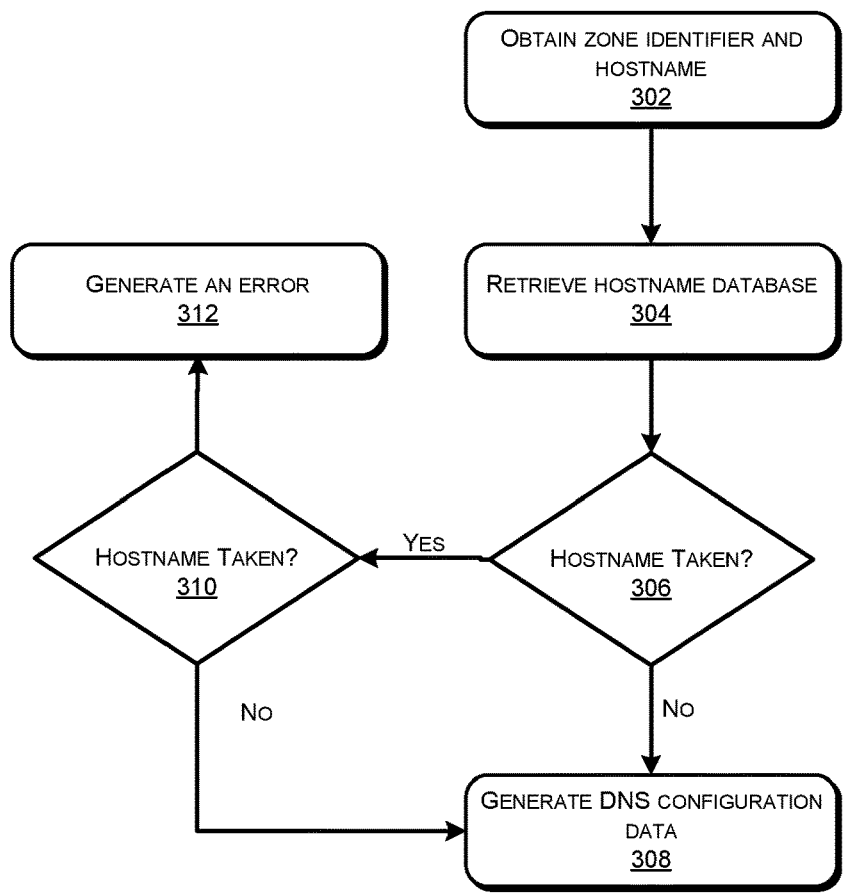
FIG. 3 is a flowchart diagram of an example process for updating DNS configuration data based on a special DNS record detected in the DNS record set of a hosted zone.

FIG. 3 is a flowchart diagram of an example process 300 for updating DNS configuration data 108 based on a special DNS record detected in the DNS record set of a hosted zone. While the steps of the flowchart are described as being performed by components of the proxy server 106, it should be appreciated that the steps of the flowchart may be performed by software, by hardware or by any combination of software and hardware. Moreover, steps of the flowchart may be performed in a different order than that shown in the figure.

As depicted in FIG. 3, at operation 302, the DNS resolution agent 112 obtains the zone identifier and requested hostname of the special DNS record. Each of the zone identifier and the requested hostname may be indicated by a key-value pair within the special DNS record (e.g., a TXT record having the value 'infra'). In some cases, the DNS resolution agent 112 parses the contents of the special DNS record to extract the zone identifier and hostname values. The special record may encode these values in a structured format to enable the DNS resolution agent 112 to parse and retrieve data. The DNS resolution agent 112 may store extracted zone identifier and hostname variables for use in subsequent operations.

At operation 304, the DNS resolution agent 112 retrieves the hostname database 110. In some cases, the DNS resolution agent 112 loads the hostname database 110 into memory. In some cases, the DNS resolution agent 112 accesses a cache memory that stores the hostname database 110. The hostname database 110 may be implemented as a relational database, a ledger of events, etc.

At operation 306, the DNS resolution agent 112 determines whether the requested hostname is assigned to a hosted zone by the hostname database 110. In some cases, the DNS resolution agent 112 performs a lookup of the requested hostname in the hostname database 110 data structure. If this lookup finds that the hostname is assigned to a hostname, the database will indicate which zone identifier the hostname is assigned to.

If the DNS resolution agent 112 determines that the requested hostname is not assigned to a hosted zone, the DNS resolution agent 112 (at operation 308) updates the DNS configuration data 108 to associate the requested hostname with the IP address of the requesting hosted zone. In some cases, the DNS resolution agent 112 updates the DNS configuration data 108 (e.g., the NS records) to map the requested hostname to the IP address of the requesting hosted zone. This update enables DNS queries for that hostname to route to the proper hosted zone. The DNS resolution agent 112 can use application programming interfaces (APIs) or database queries to modify the NS records in the DNS configuration data 108.

If the DNS resolution agent 112 determines that the requested hostname is assigned to a hosted zone, the DNS resolution agent 112 (at operation 310) determines whether the hosted zone to which the hostname is assigned is the requesting zone. In some cases, the DNS resolution agent 112 determines if the hosting zone assigned to the requested hostname matches the requesting zone from the special TXT record. If the assigned zone and the hostname match, the hostname is already configured properly for the requesting zone, so processing can skip ahead to operation 308 to update the DNS configuration data 108 based on the special DNS record. If the assigned zone differs from the requesting zone, there is a conflict.

Accordingly, if the DNS resolution agent 112 determines that the requested hostname is assigned to the requesting zone, the DNS resolution agent 112 (at operation 308) updates the DNS configuration data 108 to associate the requested hostname with the IP address of the requesting hosted zone. However, if the DNS resolution agent 112 determines that the requested hostname is assigned to a hosted zone other than the requesting zone, the DNS resolution agent 112 (at operation 312) does not update the DNS configuration data 108 based on the special DNS record and generates an error. The requesting hosted zone should choose a different hostname and submit a new request.

As described above, the process 300 allows the DNS resolution agent 112 to automatically validate hostname delegation requests from hosted zones in a safe manner. By checking the central hostname database 110, the central DNS server 106 prevents potential namespace conflicts. This allows hosted zones to independently assign hostnames while the central server handles orchestrating DNS configurations and prevents hostname allocation conflicts.

FIG. 4 provides an operational example of an entry 400 in the hostname database 110 that maps the hosted zone identifier 402 to the hostname 404. Entry 400 may, for example, be an event stored in a ledger stored in the hostname database 110. As depicted in FIG. 4, the entry 400 describes that an association between the hosted zone identifier 402 and the hostname 404 has been created via a TXT record with the value 'infra.' Entry 400 may be generated after a user inserts a TXT record with the value 'infra' in the DNS record set of the hosted zone associated with the application.

Figure 5:
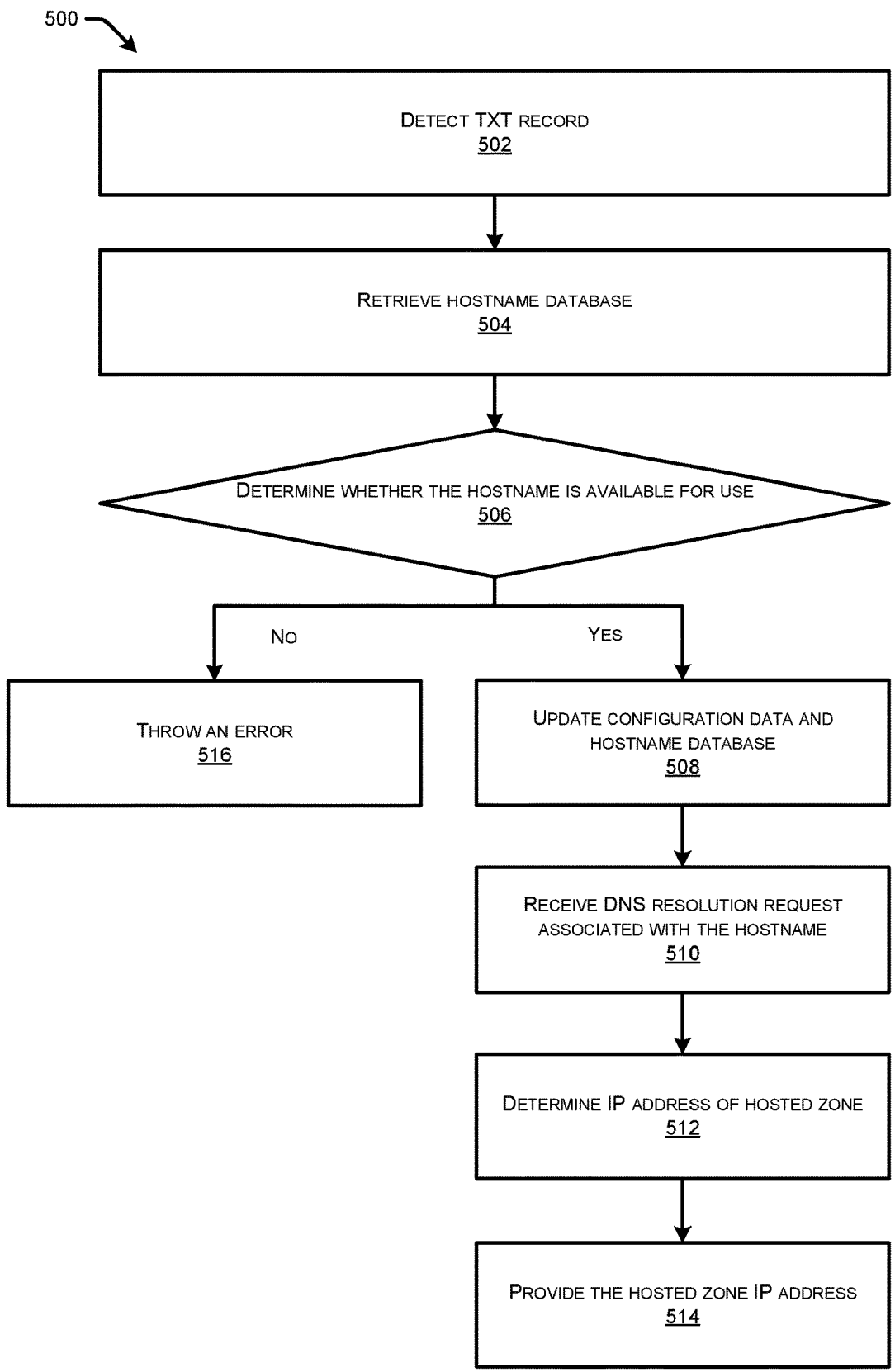
FIG. 5 is a flowchart diagram of an example process for updating DNS configuration data associated with a hosted zone and using the updated DNS configuration data to resolve a DNS request for a URL associated with the zone's hostname.

FIG. 5 is a flowchart diagram of an example process 500 for updating DNS configuration data 108 associated with a hosted zone and using the updated DNS configuration data 108 to resolve a DNS request for a URL associated with the zone's hostname. As depicted in FIG. 5, at operation 502, the DNS resolution agent 112 detects a special TXT record (e.g., a TXT record with a key-value pair whose value is 'infra') in the DNS record set of the hosted zone. While the steps of the flowchart are described as being performed by components of the proxy server 106, it should be appreciated that the steps of the flowchart may be performed by software, by hardware or by any combination of software and hardware. Moreover, steps of the flowchart may be performed in a different order than that shown in the figure.

At operation 504, the DNS resolution agent 112 retrieves the hostname database 110. As described above, the hostname database 110 may be a ledger-based data structure that records historical changes to mappings between zone identifiers and hostnames.

At operation 506, the DNS resolution agent 112 determines, based on the hostname database 110, whether the hostname requested in the special TXT record is available for use by the requesting zone. A hostname is available for use by a hosting zone if the hostname database 110 shows either that the hostname is not assigned to any hostnames or that the hostname is assigned to the hosted zone.

If the DNS resolution agent 112 determines that the hostname requested in the special TXT record is available for use by the requesting zone (operation 50-Yes), at operation 508, the DNS resolution agent 112 updates the DNS configuration data 108 based on the TXT record. In some cases, the DNS resolution agent 112 updates the DNS configuration data 108 to include a new NS record that maps the requested hostname to the IP address of the hosted zone whose DNS record set contained the special TXT record. This allows the central DNS server 106 to route future DNS queries for that hostname to the proper hosted zone.

In some cases, the DNS resolution agent 112 updates the hostname database 110 to assign the requested hostname to the unique zone identifier of the requesting hosted zone. This records the allocation of the hostname to the proper zone to avoid future 'hijackings' of the hostname by other hosted zones. If the DNS resolution agent 112 determines the requested hostname is not available (operation 506-No), the DNS resolution agent 112 does not modify the DNS configuration data 108 or hostname database 110 and may return an error indicating the hostname is already in use at operation 516.

At operation 510, the DNS resolution agent 112 receives a DNS resolution request from DNS resolver 114. This request may include a URL containing the hostname that was assigned to a hosted zone via the special TXT record previously.

At operation 512, the DNS resolution agent 112 determines, based on the updated DNS configuration data 108, that the hostname in the request's URL is mapped to the hosted zone that registered the hostname. In some cases, the DNS resolution agent 112 retrieves an NS record that maps the hostname to the IP address of the hosted zone that registered the hostname.

At operation 514, the DNS resolution agent 112 returns the IP address of the hosted zone back to the DNS resolver 114 to resolve the query. The DNS resolver 114 can then retrieve the hosted zone's DNS record set to find the specific resource record for the URL being queried.

Figure 6:
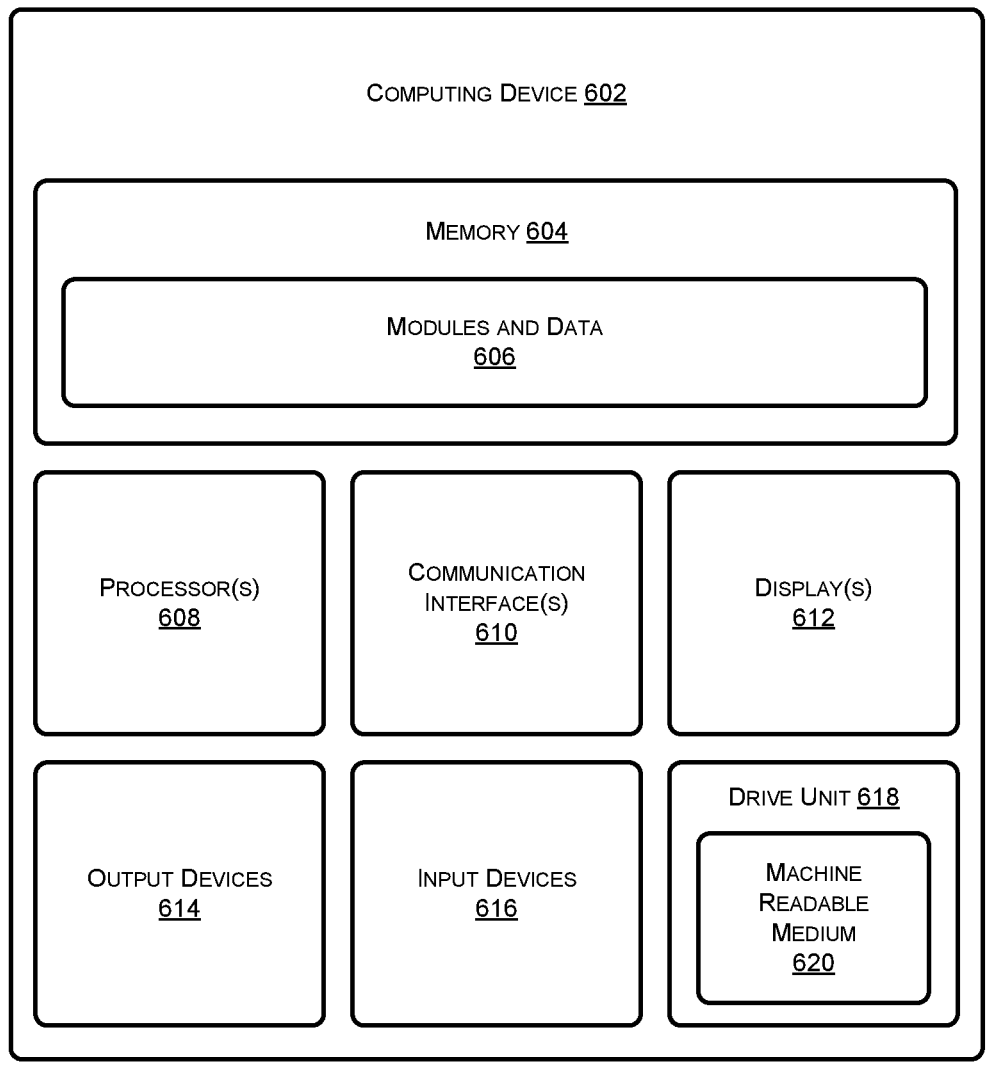
FIG. 6 shows an example system architecture for a computing device that may execute operations configured to enable automated delegation of DNS configuration by a hosted zone to a central DNS component.

FIG. 6 shows an example system architecture for a computing device 602 associated with the environment 100 described herein. A computing device 602 can be a server, computer, or other type of computing device that executes at least a portion of the environment 100. In some examples, elements of the environment 100 can be distributed among, and/or be executed by, multiple computing devices 602.

A computing device 602 can include memory 604. In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 602 associated with the environment 100. Any such non-transitory computer-readable media may be part of the computing devices 602. The memory 604 can include modules and data 606 needed to perform operations of one or more computing devices 602 of the environment 100.

One or more computing devices 602 of the environment 100 can also have processor(s) 608, communication interfaces 610, displays 612, output devices 614, input devices 616, and/or a drive unit 618 including a machine readable medium 620.

In various examples, the processor(s) 608 can be a central processing unit (CPU), a graphics processing unit (GPU), both a CPU and a GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing computer applications stored in the memory 604, which can be associated with common types of volatile (RAM) and/or nonvolatile (ROM) memory.

The communication interfaces 610 can include transceivers, modems, interfaces, antennas, telephone connections, and/or other components that can transmit and/or receive data over networks, telephone lines, or other connections.

The display 612 can be a liquid crystal display or any other type of display commonly used in computing devices. For example, a display 612 may be a touch-sensitive display screen, and can then also act as an input device or keypad, such as for providing a soft-key keyboard, navigation buttons, or any other type of input.

The output devices 614 can include any sort of output devices known in the art, such as a display 612, speakers, a vibrating mechanism, and/or a tactile feedback mechanism. Output devices 614 can also include ports for one or more peripheral devices, such as headphones, peripheral speakers, and/or a peripheral display.

The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 620 can store one or more sets of instructions, such as software or firmware, that embodies any one or more of the methodologies or functions described herein. The instructions can also reside, completely or at least partially, within the memory 604, processor(s) 608, and/or communication interface(s) 610 during execution thereof by the one or more computing devices 602 of the environment 100. The memory 604 and the processor(s) 608 also can constitute machine readable media 620.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
 detecting, by a processor of a domain name system (DNS) server, a first text record in a first DNS record set, wherein:
  the first DNS record set is stored in a first hosted zone accessible by the DNS server,
  the first text record comprises a DNS record with a text (TXT) type, and
  the first text record requests assignment of a first hostname to the first hosted zone;
 retrieving, by the processor and based on detecting the first text record, a hostname database comprising a second hostname assigned to a second hosted zone managed by the DNS server;
 determining, by the processor and by querying the hostname database, that the first hostname is available for use by the first hosted zone; and
 generating, by the processor and based on determining that the first hostname is available for use by the first hosted zone, first DNS configuration data that assigns the first hostname to the first hosted zone, wherein generating the first DNS configuration data comprises linking a virtual private cloud with the first hosted zone.

2. The method of claim 1, wherein the first DNS configuration data comprises a name server (NS) record that assigns the first hostname to an Internet Protocol (IP) address of the first hosted zone.

3. The method of claim 1, wherein determining that the first hostname is available for use by the first hosted zone comprises one of:
 determining, by querying the hostname database, that the first hostname is unassigned to the second hosted zone; or
 determining, by querying the hostname database, that the first hostname is assigned to the first hosted zone.

4. The method of claim 1, further comprising:
 generating, by the processor and based on determining that the first hostname is available for use by the first hosted zone, a new database record in the hostname database that assigns the first hostname to the first hosted zone.

5. The method of claim 1, wherein the processor is allocated by a cloud computing platform to execute the method using a serverless function.

6. The method of claim 5, wherein detecting the first text record comprises:
 receiving a notification from a first service of a cloud computing platform, wherein the first service is configured to monitor changes to the first DNS record set and a second DNS record set of the second hosted zone.

7. The method of claim 1, further comprising:
 receiving, to a first device, a DNS resolution request for a uniform resource locator (URL) that comprises the first hostname; and
 based on the first DNS configuration data, returning a first IP address of the first hostname to the first device.

8. The method of claim 7, wherein the first device is configured to, based on receiving the first IP address and using the first IP address, query the first DNS record set to determine a DNS record of the first DNS record set that assigns the URL to at least one of a second IP address, a third hostname, or a mail server.

9. A computing system, comprising:
 a processor; and
 memory storing computer-executable instructions that, when executed by the processor, cause the computing system to perform operations comprising:
  detecting a first text record in a first domain name system (DNS) record set, wherein:
   the first DNS record set is stored in a first hosted zone managed by a DNS server,
   the first text record requests assignment of a first hostname to the first hosted zone, and
   the first text record comprises a DNS record with a text (TXT) type;
  retrieving, based on detecting the first text record, a hostname database comprising a second hostname assigned to a second hosted zone managed by the DNS server;
  determining, by querying the hostname database, that the first hostname is available for use by the first hosted zone; and
  generating, based on determining that the first hostname is available for use by the first hosted zone, first DNS configuration data that assigns the first hostname to the first hosted zone, wherein generating the first DNS configuration data comprises linking a virtual private cloud with the first hosted zone.

10. The computing system of claim 9, wherein the first DNS configuration data comprises a name server (NS) record that assigns the first hostname to an Internet Protocol (IP) address of the first hosted zone.

11. The computing system of claim 9, wherein determining that the first hostname is available for use by the first hosted zone comprises one of:
   determining, by querying the hostname database, that the first hostname is unassigned to the second hosted zone; or
   determining, by querying the hostname database, that the first hostname is assigned to the first hosted zone.

12. The computing system of claim 9, the operations further comprising:
   generating, based on determining that the first hostname is available for use by the first hosted zone, a new database record in the hostname database that assigns the first hostname to the first hosted zone.

13. The computing system of claim 9, wherein the processor is allocated by a cloud computing platform to execute the operations using a serverless function.

14. The computing system of claim 13, wherein detecting the first text record comprises:
   receiving a notification from a first service of a cloud computing platform, wherein the first service is configured to monitor changes to the first DNS record set and a second DNS record set of the second hosted zone.

15. The computing system of claim 9, the operations further comprising:
   receiving, to a first device, a DNS resolution request for a uniform resource locator (URL) that comprises the first hostname; and
   determining, based on the first DNS configuration data, to return a first IP address of the first hostname to the first device.

16. The computing system of claim 15, wherein the first device is configured to, based on receiving the first IP address and using the first IP address, query the first DNS record set to determine a DNS record of the first DNS record set that assigns the URL to at least one of a second IP address, a third hostname, or a mail server.

17. One or more non-transitory computer-readable media storing computer-executable instructions that, when executed by a processor, cause the processor to perform operations, comprising:
   detecting a first text record in a first domain name system (DNS) record set, wherein:
      the first DNS record set is stored in a first hosted zone managed by a DNS server,
      the first text record requests assignment of a first hostname to the first hosted zone, and
      the first text record comprises a DNS record with a text (TXT) type;
   retrieving, based on detecting the first text record, a hostname database comprising a second hostname assigned to a second hosted zone managed by the DNS server;
   determining, by querying the hostname database, that the first hostname is available for use by the first hosted zone; and
   generating, based on determining that the first hostname is available for use by the first hosted zone, first DNS configuration data that assigns the first hostname to the first hosted zone, wherein generating the first DNS configuration data comprises linking a virtual private cloud with the first hosted zone.

18. The one or more non-transitory computer-readable media of claim 17, wherein the first DNS configuration data comprises a name server (NS) record that assigns the first hostname to an Internet Protocol (IP) address of the first hosted zone.

19. The one or more non-transitory computer-readable media of claim 17, wherein determining that the first hostname is available for use by the first hosted zone comprises one of:
   determining, by querying the hostname database, that the first hostname is unassigned to the second hosted zone; or
   determining, by querying the hostname database, that the first hostname is assigned to the first hosted zone.

20. The method of claim 1, wherein determining that the first hostname is available for use by the first hosted zone comprises:
   determining that the first hostname is unassigned to the second hostname; and
   based on determining that the first hostname is unassigned to the second hostname, determining that the first hostname is available for assignment to a resource associated with the first hosted zone as an identifier of the resource in a DNS query for an address of the resource.

21. The method of claim 1, wherein linking the virtual private cloud with the first hosted zone comprises:
   generating one or more DNS records associated with a virtual machine and in the first hosted zone, the virtual machine being deployed in the first hosted zone.

* * * * *